United States Patent

Meyer

(10) Patent No.: US 9,617,948 B2
(45) Date of Patent: Apr. 11, 2017

(54) METHOD FOR OPTIMIZING AN INTERNAL COMBUSTION ENGINE

(71) Applicant: IAV GmbH Ingenieurgesellschaft Auto und Verkehr, Berlin (DE)

(72) Inventor: Sven Meyer, Gifhorn (DE)

(73) Assignee: IAV GMBH INGENIEURGESELLSCHAFT AUTO UND VERKEHR, Berlin (DE)

( * ) Notice: Subject to any disclaimer, the term of this patent is extended or adjusted under 35 U.S.C. 154(b) by 847 days.

(21) Appl. No.: 13/832,536

(22) Filed: Mar. 15, 2013

(65) Prior Publication Data
US 2013/0245917 A1 Sep. 19, 2013

(30) Foreign Application Priority Data
Mar. 16, 2012 (DE) .................. 10 2012 005 197

(51) Int. Cl.
F02D 45/00 (2006.01)
F02D 41/14 (2006.01)
F02D 41/24 (2006.01)
H04Q 9/00 (2006.01)

(52) U.S. Cl.
CPC .......... F02D 45/00 (2013.01); F02D 41/1441 (2013.01); F02D 41/2422 (2013.01); H04Q 9/00 (2013.01); H04Q 2209/84 (2013.01)

(58) Field of Classification Search
CPC ............. F02D 41/2432; F02D 41/0007; F02D 41/222; F02D 41/3809; F02D 41/2454; F02D 41/2422; Y02T 10/144; Y02T 10/44; Y02T 10/40

USPC ........ 123/480; 701/102, 103, 104, 105, 106, 701/107, 110, 111, 114, 115
See application file for complete search history.

(56) References Cited

U.S. PATENT DOCUMENTS

| | | | |
|---|---|---|---|
| 6,234,149 B1 * | 5/2001 | Mills ............... | F02D 41/0007 123/486 |
| 6,360,733 B1 * | 3/2002 | Uberti Bona Blotto | F02D 41/008 123/486 |
| 6,560,528 B1 * | 5/2003 | Gitlin ............... | F02D 41/263 123/406.62 |
| 8,271,984 B2 | 9/2012 | Stolpe | |
| 2005/0018709 A1 | 1/2005 | Barrow | |
| 2006/0080028 A1 * | 4/2006 | Moser ............... | F01N 3/035 701/114 |
| 2010/0292866 A1 * | 11/2010 | Hofmeister ........ | G06F 9/542 701/1 |

(Continued)

FOREIGN PATENT DOCUMENTS

| | | |
|---|---|---|
| DE | 19836748 C1 | 4/2000 |
| DE | 19941440 A1 | 3/2001 |

(Continued)

*Primary Examiner* — Sizo Vilakazi
(74) *Attorney, Agent, or Firm* — Leydig, Voit & Mayer, Ltd.

(57) ABSTRACT

Internal combustion engine optimization in which individual adjustment processes to be carried out to achieve optimal cooperation between the sensors, actuators, control device and internal combustion engine are started and carried out on the basis of the quality achieved for each of the individual adjustment processes in relation to one another, the ambient conditions of the internal combustion engine and the system states of the internal combustion engine in connection with a control program.

18 Claims, 2 Drawing Sheets

(56) References Cited

U.S. PATENT DOCUMENTS

2011/0288722 A1* 11/2011 Nicosia ............... F02D 41/2422
  701/31.4
2012/0255524 A1* 10/2012 Budiscak .............. F02D 41/247
  123/480
2014/0067197 A1*  3/2014 Stadlbauer ........... G05B 13/042
  701/32.8

FOREIGN PATENT DOCUMENTS

| | | |
|---|---|---|
| DE | 10121587 A1 | 11/2002 |
| DE | 10126863 A1 | 12/2002 |
| DE | 10133670 A1 | 1/2003 |
| DE | 10142511 A1 | 4/2003 |
| DE | 10259851 A1 | 7/2004 |
| DE | 10307365 A1 | 9/2004 |
| DE | 10328787 A1 | 1/2005 |
| DE | 10332246 A1 | 2/2005 |
| DE | 102004017661 A1 | 10/2005 |
| DE | 102004026583 B3 | 11/2005 |
| DE | 102006056220 A1 | 6/2008 |
| DE | 102008005712 A1 | 7/2009 |
| DE | 102009021781 A1 | 11/2010 |
| DE | 102009037254 A1 | 2/2011 |
| DE | 102009057979 A1 | 6/2011 |
| JP | 2002285902 A | 10/2002 |

* cited by examiner

METHOD FOR OPTIMIZING AN INTERNAL COMBUSTION ENGINE

CROSS REFERENCE TO RELATED APPLICATIONS

This application claims priority to German Patent Application No. DE 10 2012 005 197.2, filed Mar. 16, 2012, which is hereby incorporated by reference herein in its entirety.

FIELD

The present invention relates to a method for optimising an internal combustion engine.

BACKGROUND

Internal combustion engines have a large number of sensors and actuators which cooperate with a control device for the purposes of control or regulation. In internal combustion engine development it is known to optimise this cooperation in such a way that the sensors detect the actual physical variables which are altered by the actuators with the accuracy required for the reliable, efficient operation of the internal combustion engine. The complete mechatronic system thus formed can be broken down into sub-systems. A first sub-system relates for example to the detection of the proportion of fresh air flowing to the internal combustion engine. A further sub-system relates for example to the regulated alteration of the proportion of fresh air flowing to the internal combustion engine. A further sub-system relates for example to the regulated alteration of a particular combustion air ratio. The individual mechatronic sub-systems are heavily dependent on one another. For example, the detection of the proportion of fresh air flowing to the internal combustion engine is of fundamental importance for the further sub-system which alters this proportion by means of a throttle valve or by means of a variable valve lift of the internal combustion engine. This dependence is also evident in the optimisation, also known as application, calibration or simply "adjustment", of the internal combustion engine during the development of the internal combustion engine, i.e. the process of adjusting the sensor system to detect the proportion of fresh air flowing to the internal combustion engine, for example by means of a mass air flow meter, must be so accurate that the process of adjusting the actuator system to alter the proportion of fresh air flowing to the internal combustion engine can be carried out reliably and efficiently. At present, for this purpose, an operator carries out one adjustment process after another, a further adjustment process or a plurality of further adjustment processes being started when the adjustment of an individual sub-system has reached a particular degree of progress. The data record fragments thus obtained are then checked by the operator with regard to the plausibility thereof and are incorporated in a higher-level data record. According to DE102004013205A1, it is known to automate the adjustment processes of the mechatronic sub-systems of an internal combustion engine. In this case, an adjustment process is modelled graphically at planning level and is executed at implementation level using software for measuring and altering characteristic variables of an internal combustion engine, i.e. this method only makes it possible to automate the individual adjustment processes.

SUMMARY

An aspect of the present invention in to enable internal combustion engine optimisation to be made even more efficient and reliable than known methods.

In an embodiment, the present invention provides a method for optimising an internal combustion engine with sensors, actuators and a control device. Cooperation between the internal combustion engine, sensors, actuators and control device is described by functional relationships which are performed by the control device. The individual adjustment processes are carried out during the development of the internal combustion engine to achieve optimal cooperation between the sensors, actuators, control device and internal combustion engine. The individual adjustment processes are started and carried out through the use of a control program, the individual adjustment processes being started and carried out based on:

a) a level of quality achieved for each of the individual adjustment processes, b) ambient conditions, and c) a system state of the internal combustion engine.

The dependencies are described by sub-matrices, where an adjacency matrix is formed from the sub-matrices. A reference adjacency matrix is formed which describes dependencies which exist for the individual adjustment processes to be started and carried out. The adjacency matrix is continuously updated and the adjustment processes are started and carried out on the basis of a comparison between the reference adjacency matrix and the updated adjacency matrix.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
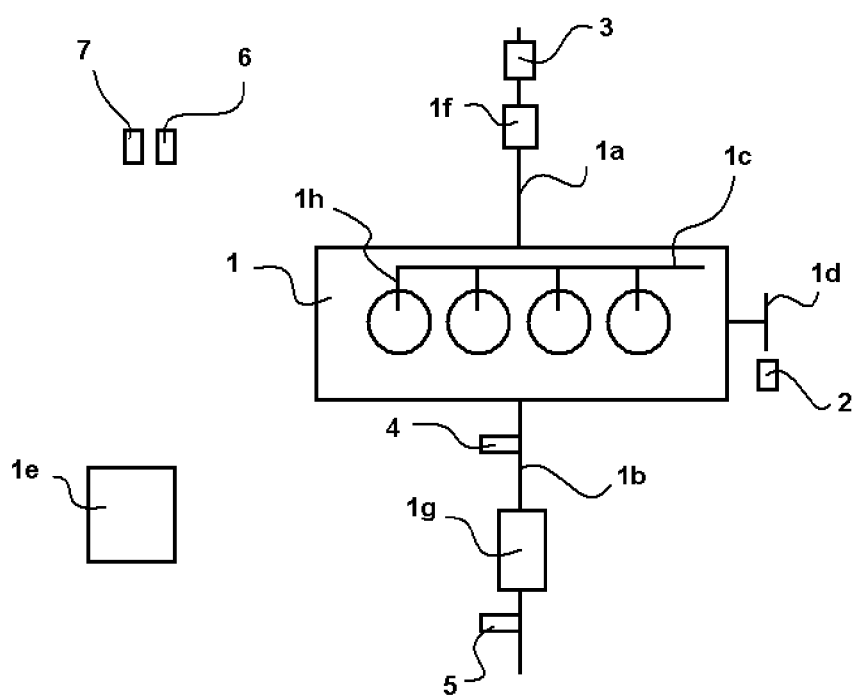
FIG. 1 is a schematic view of an internal combustion engine.

In an embodiment, the present invention provides adjustment processes to be carried out to achieve optimal cooperation between the sensors, actuators, control device and internal combustion engine are started and carried out on the basis of the quality achieved for each of the individual adjustment processes in relation to one another, the ambient conditions of the internal combustion engine and the system states of the internal combustion engine in connection with a control program. Therefore, according to the invention, the interactions between the individual adjustment processes of each mechatronic sub-system with regard to the quality thereof or with regard to the sensor and actuator systems in cooperation with the control device and the internal combustion engine are taken into consideration in such a way that a complete strategy is obtained which monitors, starts, assesses, prioritises and carries out the individual adjustment processes by means of a control program. This complete strategy is refined according to the invention by the inclusion of the ambient conditions, such as the ambient air pressure and/or temperature, in such a way that, in particular, adjustment processes are only started and carried out when the ambient conditions of the internal combustion engine are suitable. This also applies to the inclusion of the system state of the internal combustion engine, represented by operating point parameters, i.e. in particular the current load and rotational speed of the internal combustion engine at the current operating point, or other relevant variables such as the coolant temperature of the internal combustion engine, in such a way that, according to the invention, adjustment processes are advantageously only started and carried out when the internal combustion engine is operated at suitable operating points. The method according to the invention can be carried out not only within the context of the optimisation of an internal combustion engine on a test stand, but also an internal combustion engine in a vehicle, in such a way that, on the one hand, adjustment work can be started and carried out on the basis of the quality achieved for each of the individual adjustment processes in relation to one another, the ambient conditions of the internal combustion engine and the operating point parameters of the internal combustion engine, but it is also possible to conduct validation procedures to analyse and document the progress of the project. The method according to the invention may be performed in connection with external software and hardware tools which interact with the control device of the internal combustion engine, or it may be implemented directly in the software contained in the control device of the internal combustion engine for controlling and/or regulating the internal combustion engine, in such a way that, during the development of an internal combustion engine or a vehicle, it is possible to perform self-calibration of the complete mechatronic system, taking into consideration the method dependencies according to the invention. It is particularly advantageous that, as a result of the fact that the quality achieved for each of the individual adjustment processes in relation to one another, the ambient conditions of the internal combustion engine and the operating point parameters of the internal combustion engine are taken into consideration according to the invention when determining whether or not to start and carry out an adjustment process, it is possible to avoid unnecessarily recording measurement data, since the adjustment process, including the associated measurement data detection and evaluation procedures, is only ever started and carried out when said adjustment process can also be completed with a particular level of reliability and efficiency. According to the invention, the quality achieved for each of the individual adjustment processes in relation to one another, the ambient conditions of the internal combustion engine and the operating point parameters of the internal combustion engine can, when determining whether or not to start and carry out an adjustment process, be taken into consideration through the use of a condition, entered in particular by a skilled operator, in particular in the form of program code, the information on the quality achieved for each of the individual adjustment processes in relation to one another, the ambient conditions of the internal combustion engine and the operating point parameters of the internal combustion engine being processed repeatedly by means of said predetermined condition in such a way that, at particular points in time, it is possible repeatedly to determine whether further adjustment processes can be started or if the conditions required for this purpose exist. According to the invention, the consideration of the dependencies between the quality of the individual adjustment processes, the ambient conditions of the internal combustion engine and the operating point parameters of the internal combustion engine may be considered to be an order relation for a set of processes which defines the implementation sequence of the processes. This means that the method according to the invention can be illustrated and described in the form of dependent directed graphs, thereby modelling the sequential relationships between the processes and the interaction thereof. In this case, each adjustment process in particular is represented as a node and the dependencies between the adjustment processes with regard to the quality achieved in each case are illustrated in relation to one another by directed graphs, i.e. edges. In this embodiment of the present invention, the dependencies between the quality values of the adjustment processes are expediently described by means of an adjacency matrix in such a way that the method according to the invention can be implemented simply and efficiently in a software framework. The method according to the invention is substantially described, by means of an adjacency matrix within a control program, by a total of three sub-matrices, namely an adjustment process quality matrix, an internal combustion engine system state matrix and an internal combustion engine environmental condition matrix, a complete matrix being formed by multiplying said sub-matrices. This matrix thus fully describes the dependencies taken into consideration according to the invention to achieve the systematic, efficient execution of the individual adjustment processes in relation to one another and on the basis of the system state and the environmental conditions and thus makes it possible to achieve comprehensive optimisation of the complete mechatronic system, consisting of the internal combustion engine, sensors and actuators, control device and the functional relationships mapped in said control device for the control and/or regulation of the internal combustion engine.

As shown in FIG. 1, an internal combustion engine 1 comprises an intake system 1$a$, an exhaust system 1$b$, a fuel supply system 1$c$, a crankshaft 1$d$ and a control device 1$e$. A throttle member 1$f$ is arranged in the intake system 1$a$ in such a way that the proportion of fresh air flowing to the internal combustion engine 1 can be altered by means of said actuator. A catalytic converter 1$g$ is arranged in the exhaust system 1$b$ to clean the exhaust gases from the internal combustion engine 1. Fuel is supplied to the internal combustion engine 1 by injectors 1$h$ acting as actuators. In order to detect the rotational speed of the crankshaft 1$d$, a first sensor 2 is provided which operates for example on the basis of the inductive principle and senses the teeth arranged on a trigger wheel. In order to detect the proportion of fresh air flowing to the internal combustion engine 1, a second sensor 3 is provided which is formed for example as a hot film mass air flow meter and is arranged in the intake system 1$a$ upstream of the throttle member 1$f$. In order to detect the proportion of residual oxygen in the exhaust gas from the internal combustion engine 1, a third sensor 4 is provided which is arranged upstream of the catalytic converter 1$g$. Moreover, a fourth sensor 5 is arranged downstream of the catalytic converter 1$g$ to determine the effectiveness of the catalytic converter 1$g$. In addition, a fifth sensor 6 is provided to detect the ambient temperature and a sixth sensor 7 is provided to detect the ambient pressure. All of the sensors and actuators specified are connected to the control device 1$e$ to form a complete mechatronic system. This complete system can be broken down into sub-systems.

A first sub-system is for example the intake system 1$a$, comprising the throttle member 1$f$ and the second sensor 3 for detecting the proportion of fresh air flowing to the internal combustion engine 1. A regulation circuit is formed within this first sub-system in that an actual value is obtained, by means of the second sensor 3, for the proportion of fresh air flowing to the internal combustion engine 1, this is compared with a desired value and the proportion of fresh air flowing to the internal combustion engine 1 is altered by means of the throttle member 1*f* on the basis of the difference between the desired and actual values.

A second sub-system is for example the exhaust system 1*b*, comprising the catalytic converter 1*g*, the third sensor 4, the fourth sensor 5 and the fuel supply system 1*c* comprising the injectors 1*h*. A regulation circuit is also formed within this second sub-system in that an actual value is determined, by means of the third sensor 4 which is arranged upstream of the catalytic converter 1*g*, for the proportion of residual oxygen in the exhaust gas and this is compared with a desired value, the proportion of fuel supplied to the internal combustion engine 1 being altered by the injectors 1*h* on the basis of the difference between the desired and actual values.

Furthermore, a diagnostic function is performed within the second sub-system to determine the effectiveness of the catalytic converter 1*g*, the proportion of fuel being changed by the injectors 1*h* over a particular period of time on the basis of the predetermined values while the proportion of fresh air flowing to the internal combustion engine 1 remains constant, in such a way that the combustion air ratio changes and, for example, the oxygen storage capacity of the catalytic converter 1*g* is analysed by the third sensor 4 and the fourth sensor 5, as is commonly known by a person skilled in the art. In the development of an internal combustion engine 1, the sub-systems specified are optimised or an adjustment takes place of the sensors and actuators to the internal combustion engine 1. In particular, this involves data input for control and regulation functions and characteristic curves and maps which, as is commonly known, are mapped or executed in connection with the control device 1*e* and enable the internal combustion engine 1 to operate reliably and cost-effectively.

For example, the first sub-system is, or the characteristic curves, maps and control and regulation functions which interact therewith are, initially optimised by operating the internal combustion engine 1 at different operating points, and the signal from the second sensor 3 for detecting the proportion of fresh air flowing to the internal combustion engine 1 is compared with a reference signal and differences between the two signals are equalised, for example by varying an operating-point-dependent factor, the factor thus obtained being stored in a map. The reference signal may for example be generated by a further specially calibrated sensor or it is modelled. The operating-point-dependent factor can, as is commonly known, be varied manually by a person or automatically by software tools, such as a suitable MATLAB or VBA script as set out in DE102004013205A1, i.e. all procedures defined below as adjustment processes for optimising an internal combustion engine 1 may be started and carried out or completed manually or automatically. When the factors for all operating points are optimised, i.e. the signal of the second sensor 3 and the reference signal are consistent or the difference between them is within a particular range, the foundations are laid for further optimisation steps.

In particular, it is now possible to optimise the parameters of the above-mentioned regulation for altering a desired value for the proportion of fresh air flowing to the internal combustion engine 1, since the signal of the second sensor 3 is now of an appropriate level of quality or, in other words, is now accurate enough to optimise the regulation. It is firstly evident from the above example that there is a plurality of optimisation, calibration or adjustment processes within the first mechatronic sub-system of an internal combustion engine 1 which are executed during the development of an internal combustion engine 1. It is further evident that these processes interact with one another, i.e. if a particular "basic data input" quality has not yet been achieved or if the process of adjusting a basic control and/or regulation function is not sufficiently advanced, further control and/or regulation functions which build thereon should not yet be adjusted because this adjustment would lead to an unsatisfactory outcome since the "basic variables" are still changing. In addition, said adjustment processes which are executed within the first mechatronic sub-system during the optimisation procedure also interact with adjustment processes of the second mechatronic sub-system. As described, a regulation circuit is formed within said second sub-system in that an actual value is determined, by means of the third sensor 4 which is arranged upstream of the catalytic converter 1*g*, for the proportion of residual oxygen in the exhaust gas and this is compared with a desired value, the proportion of fuel supplied to the internal combustion engine 1 being altered by the injectors 1*h* on the basis of the difference between the desired and actual values. The interaction between the first and second sub-systems arises for example from the fact that the proportion of fuel supplied to the internal combustion engine 1 is altered on the basis of the proportion of fresh air supplied to the internal combustion engine 1, i.e. on the basis of the accuracy of the second sensor 3, and therefore it is not expedient to calibrate the specified regulation within the second sub-system when the basic function of providing a signal from the second sensor 3 is not yet sufficiently reliable. This means that the adjustment process relating to the above-mentioned regulation, which for example consists of operating at different operating points of the internal combustion engine 1 and, at said points, varying the regulation parameters manually or automatically by means of software, should not be started until a different adjustment process has been completed or has progressed sufficiently to have achieved a particular level of adjustment quality.

On the other hand, the adjustment processes for the different functions for controlling and/or regulating an internal combustion engine 1 are not necessarily dependent on one another and the optimisation processes do not all build on one another directly or require a particular degree of adjustment quality for a further function of this type. For example, the diagnostic function for determining the effectiveness of the catalytic converter 1*g* contained within the second sub-system is not dependent on the quality of the optimisation of the function for providing a particular value for the proportion of fresh air flowing to the internal combustion engine 1, as determined on the basis of the second sensor 3, since it is still possible to make the changes required for this purpose to the proportion of fuel over a particular period of time, even if the proportion of fresh air flowing to the internal combustion engine 1 is constant but is not at the correct level or there is a particular offset between the signal from the second sensor 3 and a reference signal. In other words, the combustion air ratio may still be varied by changing the proportion of fuel even if the proportion of fresh air has not yet been correctly determined, particularly since the combustion air ratio upstream and downstream of the catalytic converter 1*g* is obtained based on the signals from the third sensor 4 and the fourth sensor 5. In addition to the described dependencies or lack thereof between the adjustment processes of the different functions for controlling and/or regulating the internal combustion engine 1, there are also environmental conditions which determine whether an adjustment process of a function for controlling and/or regulating the internal combustion engine 1 is to be started or determine what degree of quality said function has already achieved. For example, the ambient temperature is detected by the fifth sensor 6. If the ambient temperature is very high, for example 30° C., it is not appropriate to start an adjustment process for optimising the cold-start or warm-up procedures of the internal combustion engine 1 or to start a process which determines the degree of quality already achieved for the optimisation of this function. The signal from the sixth sensor 7 may correspondingly also be used to select the adjustment processes to be started or carried out, i.e. if, for example, the ambient air pressure is very low it may be appropriate initially not to adjust a function which is dependent on the ambient air pressure.

Figure 2:
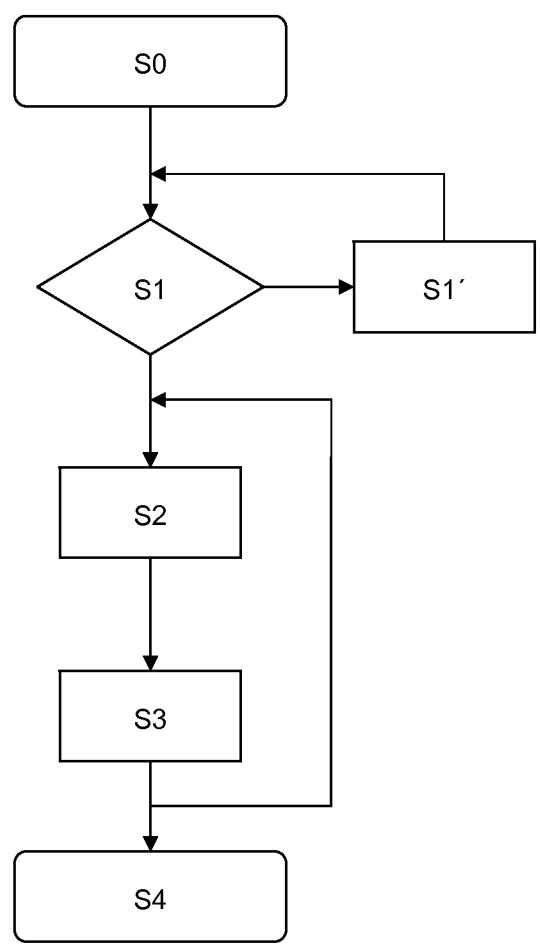
FIG. 2 is a flowchart of the method according to the invention.

According to the invention, a control program is used, as shown for example in FIG. 2, to achieve efficient optimisation of the operation of the internal combustion engine 1. The method according to the invention is initially started at S0. At S1, it is queried whether or not sufficient information is available with regard to the adjustment quality of the individual functions of the complete mechatronic system. If not, said information is initially obtained at S1', for example by means of a first test run of the internal combustion engine 1 on a test stand at predetermined operating points. Assuming that the individual functions of the internal combustion engine 1 are being adjusted for the first time, the quality of the adjustment is initially minimal in each case. The quality may for example be indicated by percentage data/values, such as 0%, 50% or 100%. A 0% value is allocated for example to the adjustment quality of a function if an important characteristic variable or state variable of said function differs by more than 20% from a reference value. A 50% value is allocated if there is only a difference of 10% remaining. A 100% value is allocated if there is only a difference of <3% remaining. With regard to the basic function described within the first mechatronic sub-system for determining the value for the proportion of fresh air flowing to the internal combustion engine 1, this quality allocation may for example have the result that the value for the proportion of fresh air, obtained on the basis of the second sensor 3, differs from a reference value by more than 20%, with the result that a value of 0% is initially allocated for the adjustment quality of said function. The adjustment quality of the further function, contained within the first sub-system, for regulating the proportion of fresh air flowing to the internal combustion engine 1 is also obtained during said test run at S1'. A possible characteristic variable or state variable of this regulation function may for example be a parameter of a response function of the regulated variable in the event of a jump in the desired value, for example the period of time until the desired value is modified. In this case there would for example also be a difference of more than 20% from a predetermined value, with the result that a quality value of only 0% is obtained once again. This also applies for example to the diagnostic function of the catalytic converter 1g contained within the second sub-system, i.e. when, for example, the time taken to achieve an evaluable signal which describes the storage capacity of the catalytic converter 1g deviates by more than 20% from a target value, a quality value of only 0% is also obtained in this case.

According to the invention, the quality values of these three functions undergo conditional testing at S2. The condition specified at S2 is for example specified by an operator. This specification of conditions acts to prioritise the adjustment processes of the individual functions of the mechatronic system in relation to one another. In other words, the conditions described in greater detail below specify a sequence in which the adjustment processes of the individual control device functions are to be carried out. This thus produces a time schedule, as it were, which takes into consideration the dependence between the individual control device functions with regard to the level of quality already achieved in the optimisation of said function. The condition at S2 is for example formulated in such a way that, in relation to the first function within the first sub-system for determining, by means of the second sensor 3, an actual value for the proportion of fresh air flowing to the internal combustion engine 1, this function is adjusted, i.e. the factors for correcting the signal of the second sensor 3 are determined, until a quality value of 100% is achieved for this function, and the adjustment of the further function within the first sub-system, namely the function for regulating the proportion of fresh air flowing to the internal combustion engine 1, only begins when the first function within the first sub-system for determining an actual value for the proportion of fresh air flowing to the internal combustion engine 1 has a quality value >50%. The condition at S2 is further formulated in such a way that the function for diagnosing the catalytic converter 1g is carried out at the same time as the adjustment of the first function within the first sub-system for determining an actual value of the proportion of fresh air flowing to the internal combustion engine 1, since this function within the second sub-system is, as previously described, not dependent on the quality of the adjustment of the first function within the first sub-system. In accordance with FIG. 2, the adjustment of the first function within the first sub-system for determining an actual value for the proportion of fresh air flowing to the internal combustion engine 1 and, at the same time, the adjustment of the function for diagnosing the catalytic converter 1g, are therefore initially started and carried out at S3, but not the adjustment of the further function within the first sub-system, namely the function for regulating the proportion of fresh air flowing to the internal combustion engine 1. The adjustment processes may be started and carried out manually by the operator, for example after the operator has been provided with an item of information, or they may be started manually and carried out automatically, or started and carried out automatically by the control program. In accordance with FIG. 2, the quality values, which consistently improve during said adjustment, are returned to S2, for example on the basis of a particular schedule. The specified condition is thus repeatedly tested at S2 and the adjustment of the further function within the first sub-system, i.e. the function for regulating the proportion of fresh air flowing to the internal combustion engine 1, begins when, according to S2, the first function within the first sub-system for determining an actual value for the proportion of fresh air flowing to the internal combustion engine 1 has reached a quality value of >50%. According to the invention, from that point on the adjustment processes for all three specified functions are executed simultaneously. Once all the adjustment processes have reached a target value, in particular a quality value of 100%, the method according to the invention comes to an end at S4.

According to the invention, the condition at S2 also comprises information on environmental influences or other variables of the internal combustion engine 1. If, for example, the ambient temperature, ambient air pressure or exhaust gas temperature do not correspond or do not yet correspond to a particular value, the adjustment process for the first function within the first sub-system for determining an actual value for the proportion of fresh air flowing to the internal combustion engine 1 is started according to condition at S2, but the adjustment process relating to the function for diagnosing the catalytic converter 1g is not yet started because said process requires the exhaust temperature to have reached a particular value. In addition to the quality value, which consistently improves during the adjustment of the only adjustment process currently being carried out, relating to said function, information on the exhaust gas temperature is, according to FIG. 2, also returned to S2 alongside said quality value and, when the exhaust gas temperature has reached a value which meets the condition, the adjustment process relating to the function for diagnosing the catalytic converter 1g is started alongside the adjustment process already running or is aborted again if the temperature falls below the condition value.

According to the invention, the condition at S2 also comprises information on the operating point parameters of the internal combustion engine 1, i.e. the system state of the internal combustion engine 1, in such a way that an adjustment process is started, or is aborted if particular operating parameters are not met. Assuming that the internal combustion engine 1 is primarily operated at operating points in the high load range and, in order to protect the catalytic converter 1g, a comparatively large proportion of fuel is supplied to the internal combustion engine 1, it is in this case not expedient to start or carry out the adjustment process relating to the function for diagnosing the catalytic converter 1g, since it is not possible to vary the combustion air ratio as required for said process without risking thermal damage to the catalytic converter 1g.

The condition at S2 may also contain information on the functional relationships between the individual adjustment processes, i.e. basic functions, such as the first function within the first sub-system for determining an actual value for the proportion of fresh air flowing to the internal combustion engine 1, are to be carried out, on account of the system or function, before functions which build thereon, such as the further function within the first sub-system, namely the function for regulating the proportion of fresh air flowing to the internal combustion engine 1.

According to the invention, it is further possible to describe the dependency between the individual adjustment processes with regard to the quality achieved, the environmental conditions and the operating point parameters of the internal combustion engine within a control program by means of an adjacency matrix. In this case, the adjacency matrix is for example formed from three sub-matrices. A first sub-matrix $$P_{adj_{P_{MSG}}} = G = \begin{pmatrix} g_{P_1 P_1} & g_{P_1 P_2} & \cdots & g_{P_1 P_m} \\ g_{P_2 P_1} & g_{P_2 P_2} & \cdots & g_{P_2 P_m} \\ \vdots & \vdots & \vdots & \vdots \\ g_{P_m P_1} & g_{P_m P_2} & \cdots & g_{P_m P_m} \end{pmatrix} = \begin{pmatrix} \vec{0} & g_{P_1 P_2} & \cdots & g_{P_1 P_m} \\ g_{P_2 P_1} & \vec{0} & \cdots & g_{P_2 P_m} \\ \vdots & \vdots & \vdots & \vdots \\ g_{P_m P_1} & g_{P_m P_2} & \cdots & \vec{0} \end{pmatrix}$$

relates to the quality G of the individual adjustment processes P in the decision of whether or not to start and carry out an adjustment process P. This first sub-matrix is square, i.e. it has the same number of m rows and n columns in accordance with the number m=n adjustment processes P, and describes the individual dependencies between the adjustment processes P. For example, the adjustment process P1 in the above embodiment corresponds to the first function within the first sub-system for determining, by means of the second sensor 3, an actual value for the proportion of fresh air flowing to the internal combustion engine 1, and the adjustment process P2 corresponds to the further function within the first sub-system, namely the function relating to the regulated alteration of the proportion of fresh air flowing to the internal combustion engine 1.

The second sub-matrix $$P_{adj_{S_{MSG}}} = S = \begin{pmatrix} g_{S_1 P_1} & g_{S_2 P_1} & \cdots & g_{S_q P_1} \\ g_{S_1 P_2} & g_{S_2 P_2} & \cdots & g_{S_q P_2} \\ \vdots & \vdots & \vdots & \vdots \\ g_{S_1 P_m} & g_{S_2 P_m} & \cdots & g_{S_q P_m} \end{pmatrix}$$

relates to the consideration of the different system states S in the decision of whether to start and carry out an adjustment process P, i.e. in particular the consideration of the operating point parameters of the internal combustion engine 1, the number of m lines corresponding to the number of adjustment processes P and the number of q columns corresponding to the number of system states S. For example, the adjustment process P1 in the above embodiment corresponds to the first function within the first sub-system for determining, by means of the second sensor 3, an actual value for the proportion of fresh air flowing to the internal combustion engine 1, the adjustment process P2 corresponds to the further function within the first sub-system, namely the function relating to the regulated alteration of the proportion of fresh air flowing to the internal combustion engine 1, and the system state S1 represents an operating point of the internal combustion engine 1 or the parameters which describe said point.

The third sub-matrix $$P_{adj_{U_{MSG}}} = \begin{pmatrix} g_{U_1 P_1} & g_{U_2 P_1} & \cdots & g_{U_r P_1} \\ g_{U_1 P_2} & g_{U_2 P_2} & \cdots & g_{U_r P_2} \\ \vdots & \vdots & \vdots & \vdots \\ g_{U_1 P_m} & g_{U_2 P_m} & \cdots & g_{U_r P_m} \end{pmatrix}$$

relates to the consideration of the different environmental conditions U in the decision of whether to start and carry out an adjustment process P, i.e. the consideration of the ambient conditions of the internal combustion engine 1, such as the air pressure or air temperature, the number of m lines corresponding to the number of adjustment processes P and the number of q columns corresponding to the number of environmental conditions U. For example, the adjustment process P1 in the above embodiment corresponds to the first function within the first sub-system for determining, by means of the second sensor 3, an actual value for the proportion of fresh air flowing to the internal combustion engine 1, the adjustment process P2 corresponds to the further function within the first sub-system, namely the function relating to the regulated alteration of the proportion of fresh air flowing to the internal combustion engine 1, and the environmental condition U1 represents for example the air pressure and/or air temperature around the internal combustion engine 1.

Multiplication of the three sub-matrices produces a complete matrix $$P_{adj_{PSU_{MSG}}} = P_{adj_{P_{MSG}}} \cdot P_{adj_{S_{MSG}}} \cdot P_{adj_{U_{MSG}}}$$

which, according to the invention, describes the dependencies between the individual adjustment processes P with regard to the quality G thereof, the dependencies of the individual adjustment processes P with regard to the environmental condition U (for example pressure and temperature) of the internal combustion engine 1 and the dependencies of the individual adjustment processes with regard to the system state S, in particular in relation to the operating point parameters of the internal combustion engine 1.

This means that a control program (scheduler) is defined according to the invention, matrix operations being used to define the control program. The population of the matrix elements determines the complexity of the matrix operation. If particular adjustment processes P have been completed during the execution of the control program, i.e. the maximum possible degree of quality G has been achieved, the corresponding elements of the first sub-matrix are filled with zeros.

In summary, the method according to the invention is executed as follows by means of a control program (scheduler) using, for example, the three adjacency matrices specified.

The numerical values of each individual adjacency matrix are updated cyclically.

This means that they are updated for example by polling, i.e. by cyclically querying whether there have been changes in values relating to the environmental conditions U and the system states S, as provided for example by external hardware and/or software connected to the control device 1e.

As a result, the adjacency matrices $$P_{adj_{U_{MSG}}} \text{ and } P_{adj_{S_{MSG}}}$$

reflect the status of the environmental conditions U and the system states S at all times.

The adjacency matrix $$P_{adj_{P_{MSG}}},$$

representing the dependencies between the adjustment processes P, is updated on the basis of the changes thereto during an ongoing adjustment process P.

In order for the current status of the scheduler, i.e. the individual adjacency matrices $$P_{adj_{U_{MSG}}}, P_{adj_{S_{MSG}}} \text{ and } P_{adj_{P_{MSG}}},$$

to be available at any time as determined by the polling procedure, the scheduler must obviously be updated and evaluated in accordance with the polling frequency.

On the basis of this cyclical evaluation, the adjustment process P with the highest priority determined by the evaluation of the three adjacency matrices is then started.

During an ongoing adjustment process P, the scheduler can also, at any time, produce a new order of priority for the adjustment processes P as a result of the ongoing updates. This can lead for example to an ongoing adjustment process P being aborted and another adjustment process being started instead, for example on account of changes in the system states S.

In this embodiment, the adjustment processes P may also be started and carried out manually by the operator, for example after the operator has been provided with an item of information, or they may be started manually and carried out automatically, or started and carried out automatically by the control program.

For illustration purposes, the method according to the invention carried out by a control program (scheduler) using an adjacency matrix will be outlined again below with reference to a practical example:

At time $t_0$, the situation is as follows. For simplification, only the idling range of the internal combustion engine 1 will be considered. There are three adjustment processes P1 to P3.

The first adjustment process P1 relates to the adjustment of the first function within the first sub-system for determining, by means of the second sensor 3, a current value for the proportion of fresh air flowing to the internal combustion engine 1, referred to below as "charge detection". Charge detection is known to be a basic function on which a large number of further functions build.

The second adjustment process P2 relates to the adjustment of the "torque path", i.e. a function which describes the relationship between operating parameters of the internal combustion engine 1 and the torque provided by the internal combustion engine 1. The operating parameters are, in particular, rotational speed, ignition point, combustion air ratio and the proportion of fresh air flowing to the internal combustion engine 1, referred to below as "charge". The torque path therefore builds on the charge detection.

The third adjustment process P3 relates to the regulation of the rotational speed of the internal combustion engine 1 when idling, referred to below as "idle regulator". The "idle regulator" builds on the torque path, i.e. as is commonly known, "torque reserves" are retained to regulate the rotational speed when idling and are used to alter the rotational speed rapidly, the torque reserves being derived from the torque path.

The charge detection adjustment process P1 is sufficiently accurately parameterised for all operating points of the internal combustion engine 1, i.e. a sufficient quality has been achieved, in this case greater than 97%, for the adjustment process P1.

The subsequent torque path adjustment process P2 is also sufficiently accurately parameterised at all operating points of the internal combustion engine (load/rotational speed) except in the idling range, i.e. a level of quality, in this case less than 97%, has been achieved for the adjustment process P2.

The idle regulator adjustment process P3 which follows therefore cannot be activated until a sufficient quality has been achieved in the idling range for the torque path adjustment process P2.

The three matrices, as outlined above, are therefore as follows at time $t_0$:

$$P_{adj_{P_{MSG}}} =$$

$$G = \begin{bmatrix} g_{P_1P_1} & g_{P_1P_2} & g_{P_1P_3} \\ g_{P_2P_1} & g_{P_2P_2} & g_{P_2P_3} \\ g_{P_3P_1} & g_{P_3P_2} & g_{P_3P_3} \end{bmatrix} = \begin{bmatrix} \vec{0} & g_{P_1P_2} & g_{P_1P_3} \\ g_{P_2P_1} & \vec{0} & g_{P_2P_3} \\ g_{P_3P_1} & g_{P_3P_2} & \vec{0} \end{bmatrix} = \begin{bmatrix} 0 & 97 & 97 \\ 0 & 0 & 97 \\ 0 & 0 & 0 \end{bmatrix}$$

The matrix element $(g_{P_1P_2})$ therefore indicates that the charge detection adjustment process P1 must reach a quality of 97% before the torque path adjustment process P2 may be started.

The matrix element $(g_{P_1P_3})$ therefore indicates that the charge detection adjustment process P1 must reach a quality of 97% before the idle regulator adjustment process P3 may be started. This is, however, more of an academic matter since in practice it is assumed that only a sufficient level of accuracy for the charge detection will bring about a sufficient level of accuracy for the torque data input.

The matrix element $(g_{P_2P_3})$ therefore indicates that the torque path adjustment process P2 must reach a quality of 97% before the idle regulator adjustment process P3 may be started.

Therefore both the charge detection and the torque path must reach a level of accuracy of 97% before the idle regulator can be parameterised.

If the evaluation by the scheduler indicates that the torque path adjustment process P2 has a level of quality of less than 97% (for example if the difference between the actual measured torque of the internal combustion engine 1 on a test stand and the torque modelled by means of the torque path is greater than 3%), the idle regulator adjustment process P3 is not started.

With regard to the system states S, the following is now obtained:

$$P_{adj_{S_{MSG}}} = S = \begin{bmatrix} \text{idling range,} & \text{vehicle stationary,} & \text{vehicle travelling} \\ \text{charge detection active} & \text{charge detection active} & \text{charge detection active} \\ \text{idling range,} & \text{vehicle stationary,} & \text{vehicle travelling} \\ \text{torque path active} & \text{torque path active} & \text{torque path active} \\ \text{idling range,} & \text{vehicle stationary,} & \text{vehicle travelling} \\ \text{IR active} & \text{IR active} & \text{torque path active} \end{bmatrix} = \begin{bmatrix} 1 & 1 & 1 \\ 1 & 1 & 1 \\ 1 & 1 & 1 \end{bmatrix}$$

In the above, "idling range" indicates that the internal combustion engine 1 is idling at a particular rotational speed, i.e. the operating point parameters are the rotational speed and "zero load".

Furthermore, the abbreviation "IR" stands for idle regulator and the expression "vehicle stationary/travelling" relates to the state in which the internal combustion engine 1 is arranged in a vehicle in order to drive said vehicle and the internal combustion engine 1 is still operating/active.

The matrix elements are therefore populated accordingly with 1 and/or 0 depending on the system state (in this case only the idling range is considered). Whether or not each matrix element for the corresponding process P1, P2 or P3 is populated depends on whether the corresponding system state influences the corresponding process P, for example the idling range is not relevant to the diagnosis of the catalytic converter 1g and therefore the corresponding element in the matrix would be set to 0.

In relation to the ambient conditions U, a warm internal combustion engine 1 (for example coolant temperature greater than 70° C.) and ambient pressure of 1,024 mbar (i.e. no other environmental conditions) gives rise to the following:

$$P_{adj_{U_{MSG}}} = P_{adj_{U_{MSG}}} =$$

$$\begin{bmatrix} g_{U_1P_1} & g_{U_2P_1} & g_{U_3P_1} \\ g_{U_1P_2} & g_{U_2P_2} & g_{U_3P_2} \\ g_{U_1P_3} & g_{U_2P_3} & g_{U_3P_3} \end{bmatrix} = \begin{bmatrix} \text{warm motor,} & \text{normal pressure,} & 0 \\ \text{charge detection active} & \text{charge detection active} & \\ \text{warm motor,} & \text{normal pressure,} & 0 \\ \text{torque path active} & \text{torque path active} & \\ \text{warm motor,} & \text{normal pressure,} & 0 \\ \text{IR active} & \text{IR active} & \end{bmatrix} = \begin{bmatrix} 1 & 1 & 0 \\ 1 & 1 & 0 \\ 1 & 1 & 0 \end{bmatrix}$$

As previously mentioned, only matrix elements with elements (ambient conditions U) that influence the associated process P are populated.

Multiplying all the matrices gives rise to the following:

$$P_{adj_{PSU_{MSG}}} = P_{adj_{P_{MSG}}} \cdot P_{adj_{S_{MSG}}} \cdot P_{adj_{U_{MSG}}} = \begin{bmatrix} 582 & 582 & 0 \\ 291 & 291 & 0 \\ 0 & 0 & 0 \end{bmatrix}$$

i.e. the idle regulator adjustment process P3 would be started on account of the environmental conditions U, the system states S and a sufficient level of quality of more than 97% accuracy for the previous charge detection and torque data input procedures or a level of quality of this type for the two adjustment processes P1 and P2. If, as assumed, these quality criteria are not yet satisfied or the overall quality criterion formed by multiplication and represented by $$P_{adj_{PSU_{MSG}}}$$

is not satisfied, the adjustment process P3 is not started. Therefore this matrix $$P_{adj_{PSU_{MSG}}}$$

can be considered to be a reference matrix for triggering the idle regulator application process P3.

At time $t_1$, it is assumed that the vehicle is travelling, giving rise to the following matrices:

$$P_{adj_{P_{MSG}}} = G = \begin{bmatrix} 0 & 97 & 97 \\ 0 & 0 & 97 \\ 0 & 0 & 0 \end{bmatrix}, P_{adj_{S_{MSG}}} = S = \begin{bmatrix} 0 & 0 & 1 \\ 0 & 0 & 1 \\ 0 & 0 & 1 \end{bmatrix},$$

$$P_{adj_{U_{MSG}}} = \begin{bmatrix} 1 & 1 & 0 \\ 1 & 1 & 0 \\ 1 & 1 & 0 \end{bmatrix}$$

-continued $$P_{adj_{PSU_{MSG}}} = P_{adj_{P_{MSG}}} \cdot P_{adj_{S_{MSG}}} \cdot P_{adj_{U_{MSG}}} = \begin{bmatrix} 194 & 194 & 0 \\ 97 & 97 & 0 \\ 0 & 0 & 0 \end{bmatrix}$$

As is evident, the values for the elements in the complete matrix $$P_{adj_{PSU_{MSG}}}$$

have changed in accordance with the changed system status S. Through the definition of a reference matrix $$P_{adj_{PSU_{MSG}}}$$

at time $t_0$ which describes the conditions in which the corresponding adjustment processes P can be started and carried out (for example as briefly described for idling regulation at t0), the scheduler can decide accordingly which adjustment processes P can be started and carried out by actively comparing the reference matrix $$P_{adj_{PSU_{MSG}}}$$

at time $t_0$ and the updated matrix $$P_{adj_{PSU_{MSG}}}$$

at time $t_1$.

The formation of the complete and/or reference matrix $$P_{adj_{PSU_{MSG}}}$$

may obviously be extended with further sub-matrices, said sub-matrices describing the functional relationships between the adjustment processes P and/or the functional relationships which map the cooperation between the internal combustion engine, the sensors, the actuators and the control device and are performed by the control device. For example, the fact that the charge detection must be adjusted before the torque path can be adjusted represents functional cooperation between the adjustment processes P, since the torque path builds on the characteristic variables of the charge detection.

Further operating point parameters (applicable to actual values and also desired values) which are predetermined by the control device are: rotational speed/amount of injected fuel, speed/load, speed/amount of injected fuel, rotational speed/torque, speed/torque, coolant temperature, intake air temperature, time after start-up, catalytic converter temperature (before, in and after catalytic converter), air volume, lambda (before and after catalytic converter), idling status, status of each individual diagnosis (ready for operation, activated, switched off, blocked, etc.), throttle valve position, VVT system position, variable valve timing, mass air flow meter status, oil temperature, oil pressure, fuel temperature, temperature sensor system in the exhaust gas treatment system.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B." Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise.

The invention claimed is:

1. A method for calibrating an internal combustion engine having sensors, actuators and a control device, wherein cooperation between the internal combustion engine, the sensors, the actuators, and the control device is described by functional relationships mapped in the control device, the method comprising:

carrying out individual adjustment processes to achieve cooperation between the sensors, the actuators, the control device, and the internal combustion engine by:
forming a reference adjacency matrix that describes dependencies that exist for adjustment processes to be carried out, wherein the reference adjacency matrix is formed from sub matrices that describe the dependencies that exist for the adjustment processes to be carried out;
specifying a sequence by which forming an updated adjacency matrix by updating the reference adjacency matrix is carried out;
measuring values corresponding to one or more of a quality level of the individual adjustment processes, an operating point of the internal combustion engine, and environmental conditions;
forming an updated adjacency matrix by updating the reference adjacency matrix with the measured values; and
varying, based on a comparison between the reference adjacency matrix and the updated adjacency matrix, at least one of:
an operating point dependent factor of the internal combustion engine until the difference between a signal received from a sensor and a reference signal is within a particular range,
operating parameters of the internal combustion engine in order to adjust a diagnostic function, and
regulation parameters of the internal combustion engine in order to adjust a function for a control and/or regulation,
wherein the individual ones of the adjustment processes are started and carried out through the use of a control program, wherein the individual ones of the adjustment processes are started and carried out based on:
a) quality levels achieved for each of the individual adjustment processes,
b) environmental conditions, and
c) an operating point of the internal combustion engine, and
wherein the dependencies that exist for the adjustment processes to be carried out include a dependency of starting and carrying out a further adjustment process when a first adjustment process has achieved a threshold quality value.

2. The method according to claim 1, wherein the individual ones of the adjustment processes are further carried out based on:
d) functional relationships between the adjustment processes.

3. The method according to claim 1, wherein the ambient conditions include at least one of ambient air pressure, ambient temperature or intake air temperature.

4. The method according to claim 2, wherein the ambient conditions include at least one of ambient air pressure, ambient temperature or intake air temperature.

5. The method according to claim 1, wherein the system state of the internal combustion engine is described by operating point parameters of the internal combustion engine.

6. The method according to claim 2, wherein the system state of the internal combustion engine is described by operating point parameters of the internal combustion engine.

7. The method according to claim 3, wherein the system state of the internal combustion engine is described by operating point parameters of the internal combustion engine.

8. The method according to claim 4, wherein the system state of the internal combustion engine is described by operating point parameters of the internal combustion engine.

9. The method according to claim 5, wherein the operating point parameters include at least one of a rotational speed or a load of the internal combustion engine.

10. The method according to claim 8, wherein the operating point parameters include at least one of a rotational speed or a load of the internal combustion engine.

11. The method according to claim 1, wherein the sub matrices that describe the dependencies that exist for the adjustment processes to be carried out include:
a first adjacency sub matrix that relates the level of quality of each of the adjustment processes to a decision of whether or not to carry out an individual one of the adjustment processes,
a second adjacency sub matrix that relates the system state of the internal combustion engine to a decision of whether or not to carry out an individual one of the adjustment processes, and
a third adjacency sub matrix that relates the ambient conditions to a decision of whether or not to carry out an individual one of the adjustment processes.

12. The method according to claim 11, wherein the forming an updated adjacency matrix by updating the reference adjacency matrix includes:
updating the first adjacency sub matrix based on changes during one or more ongoing individual ones of the adjustment processes,
updating the second adjacency sub matrix based on changes in values relating to the system state of the internal combustion engine, and
updating the third adjacency sub matrix based on changes in values relating to the ambient conditions.

13. The method according to claim 1, further comprising specifying a sequence in which the adjustment processes are to be carried out.

14. The method according to claim 1, wherein the adjustment processes include one or more of determining a value for a proportion of fresh air flowing to the internal combustion engine, regulating the proportion of fresh air flowing to the internal combustion engine, and determining an effectiveness of a catalytic converter.

15. The method according to claim 1, wherein the carrying out individual ones of the adjustment processes on the basis of a comparison between the reference adjacency matrix and the updated adjacency matrix to achieve cooperation between the sensors, the actuators, and the control device includes one or more of:
altering a proportion of fuel supplied to the internal combustion engine by one or more fuel injectors,
changing a combustion air to fuel ratio of the internal combustion engine, and
altering a proportion of fresh air flowing to the internal combustion engine by a throttle member.

16. The method according to claim 1, wherein the varying, based on a comparison between the reference adjacency matrix and the updated adjacency matrix, at least one of an operating point dependent factor of the internal combustion engine until the difference between a signal received from a sensor and a reference signal is within a particular range, operating parameters of the internal combustion engine in order to adjust a diagnostic function, and regulation parameters in order to adjust a function for a control and/or regulation comprises adjusting a proportion of fresh air flowing to the internal combustion engine and adjusting a proportion of fuel supplied to the internal combustion engine.

17. The method according to claim 1, wherein the signal received from a sensor is a signal received from one of the group consisting of: a crankshaft rotational speed sensor, a hot film mass air flow meter, a residual oxygen sensor disposed upstream of a catalytic converter, a residual oxygen sensor disposed downstream of the catalytic converter, an ambient temperature sensor, and am ambient pressure sensor.

18. A method for calibrating an internal combustion engine having sensors, actuators and a control device, wherein cooperation between the internal combustion engine, the sensors, the actuators, and the control device is described by functional relationships mapped in the control device, the method comprising:
carrying out individual adjustment processes to achieve cooperation between the sensors, the actuators, the control device, and the internal combustion engine by:
forming a reference adjacency matrix that describes dependencies that exist for adjustment processes to be carried out, wherein the reference adjacency matrix is formed from sub matrices that describe the dependencies that exist for the adjustment processes to be carried out;
specifying a sequence by which forming an updated adjacency matrix by updating the reference adjacency matrix is carried out;
measuring values corresponding to one or more of a quality level of the individual adjustment processes, an operating point of the internal combustion engine, and environmental conditions;

forming an updated adjacency matrix by updating the reference adjacency matrix with the measured values; and varying, based on a comparison between the reference adjacency matrix and the updated adjacency matrix, an operating point dependent factor of the internal combustion engine until the difference between a signal received from a sensor and a reference signal is within a particular range, wherein the individual ones of the adjustment processes are started and carried out through the use of a control program, wherein the individual ones of the adjustment processes are started and carried out based on:

a) quality levels achieved for each of the individual adjustment processes, b) environmental conditions, and c) an operating point of the internal combustion engine, and wherein the dependencies that exist for the adjustment processes to be carried out include a dependency of starting and carrying out a further adjustment process when a first adjustment process has achieved a threshold quality value.

* * * * *